(12) United States Patent
Bridgewater et al.

(10) Patent No.: US 10,575,512 B2
(45) Date of Patent: Mar. 3, 2020

(54) OUTRIGGER CLAMP WITH ATTACHMENT POINT

(71) Applicant: GEM Products, Inc., Orange Park, FL (US)

(72) Inventors: Erle Matthew Bridgewater, Orange Park, FL (US); Michael Joseph Fafard, Orange Park, FL (US); Wylie Davin Nagler, Orange Park, FL (US); Matthew Stewart Onorato, Orange Park, FL (US); Jason Sarnowski, Orange Park, FL (US)

(73) Assignee: GEM Products, Inc., Jacksonville, FL (US)

( * ) Notice: Subject to any disclaimer, the term of this patent is extended or adjusted under 35 U.S.C. 154(b) by 21 days.

(21) Appl. No.: 15/705,979

(22) Filed: Sep. 15, 2017

(65) Prior Publication Data

US 2018/0014522 A1 Jan. 18, 2018

Related U.S. Application Data

(63) Continuation-in-part of application No. 15/214,006, filed on Jul. 19, 2016, which is a continuation-in-part of application No. 14/863,964, filed on Sep. 24, 2015.

(51) Int. Cl.
*A01K 91/08* (2006.01)
*A01K 87/04* (2006.01)
(Continued)

(52) U.S. Cl.
CPC .............. *A01K 97/10* (2013.01); *A01K 87/02* (2013.01); *A01K 87/025* (2013.01); *A01K 87/04* (2013.01);
(Continued)

(58) Field of Classification Search
CPC ........ A01K 87/04; A01K 91/08; A01K 87/02; A01K 87/025; A01K 97/06; B63B 17/00;
(Continued)

(56) References Cited

U.S. PATENT DOCUMENTS

| | | | | |
|---|---|---|---|---|
| 104,884 A | * | 6/1870 | Reinshagen | F16B 7/182 403/286 |
| 173,534 A | * | 2/1876 | Endicott | A01K 87/00 43/25 |

(Continued)

FOREIGN PATENT DOCUMENTS

| | | | | |
|---|---|---|---|---|
| EP | 0345401 A1 | * | 12/1989 | ............. A01K 87/04 |
| FR | 2696900 A1 | * | 4/1994 | ........... A01K 87/005 |

(Continued)

OTHER PUBLICATIONS

Translation of FR2696900.*

(Continued)

*Primary Examiner* — Darren W Ark
(74) *Attorney, Agent, or Firm* — Seyfarth Shaw LLP

(57) ABSTRACT

An outrigger clamp to couple together two or more nestable tubes. The clamp includes a guide for retaining filament, and an attachment point for receiving accessories without interfering with the filament and guides. The guide and attachment point can rotate about an axis based on the forces applied to the outrigger to better align the filament and guides, and therefore align the forces applied to the outrigger and filament. The retainer can be, for example, one or more rollers that help prevent the filament from becoming creased or kinked during use.

12 Claims, 16 Drawing Sheets

(51) Int. Cl.
*A01K 87/02* (2006.01)
*A01K 97/06* (2006.01)
*A01K 97/10* (2006.01)
*F16B 7/14* (2006.01)

(52) U.S. Cl.
CPC .............. *A01K 91/08* (2013.01); *A01K 97/06* (2013.01); *F16B 7/1418* (2013.01)

(58) Field of Classification Search
CPC ........ B63B 35/14; F16L 21/007; F16L 21/02; F16L 21/022; F16L 21/04; F16L 21/08
USPC ............ 43/24, 18.1 CT, 27.4, 25.2; 114/255, 114/364; 403/292, 293, 296, 301, 300, 403/305, 309–311, 313; 285/298, 302
See application file for complete search history.

(56) References Cited

U.S. PATENT DOCUMENTS

| | | | | |
|---|---|---|---|---|
| 252,008 A * | 1/1882 | Andrews | A01K 87/02 | 43/18.1 CT |
| 742,490 A * | 10/1903 | Pray | B63H 16/06 | 43/24 |
| 839,104 A * | 12/1906 | Buschemeyer | A01K 87/04 | 43/24 |
| 1,856,551 A * | 5/1932 | Haberl | A01K 87/04 | 123/642 |
| 1,970,624 A * | 8/1934 | Recker | F21V 21/22 | 248/337 |
| 2,296,174 A * | 9/1942 | Meisler | A01K 87/04 | 43/24 |
| 2,452,275 A * | 10/1948 | Woodling | F16L 19/065 | 285/341 |
| 2,452,788 A * | 11/1948 | Peters | A01K 87/025 | 43/17 |
| 2,578,663 A * | 12/1951 | Beaupre | A01K 87/025 | 43/18.1 R |
| 2,652,654 A * | 9/1953 | Edston | A01K 87/04 | 125/11.15 |
| 3,063,668 A * | 11/1962 | Yohe | A01K 91/08 | 248/538 |
| 3,083,041 A * | 3/1963 | Owenmark Olov | A47L 9/244 | 285/302 |
| 3,103,375 A * | 9/1963 | McMullin | E04H 12/182 | 248/188.5 |
| 3,122,383 A * | 2/1964 | Hirsch | F16L 37/1235 | 285/397 |
| 3,380,097 A * | 4/1968 | Pharris | B05C 17/0205 | 15/145 |
| 3,447,254 A * | 6/1969 | Sobel | A01K 87/025 | 43/18.1 HR |
| 3,588,154 A * | 6/1971 | Voight | F16D 1/04 | 403/300 |
| 3,732,644 A * | 5/1973 | Kavanagh | A01K 87/04 | 43/22 |
| 3,891,294 A * | 6/1975 | Philibert | H02G 3/0683 | 174/663 |
| 3,968,587 A * | 7/1976 | Kammeraad | A01K 91/08 | 43/27.4 |
| 3,971,151 A * | 7/1976 | Banner | A01K 87/04 | 43/24 |
| 4,060,924 A * | 12/1977 | Cunningham | A01K 87/04 | 43/24 |
| 4,217,061 A * | 8/1980 | Eiland | F16D 1/04 | 403/313 |
| 4,238,900 A * | 12/1980 | Cunningham | A01K 87/04 | 43/24 |
| 4,428,697 A * | 1/1984 | Ruland | F16D 1/0864 | 403/290 |
| 4,860,482 A * | 8/1989 | Yamato | A01K 87/04 | 43/18.1 R |
| 4,928,420 A * | 5/1990 | Jackson | A01K 91/08 | 43/27.4 |
| 4,993,346 A * | 2/1991 | Rupp | A01K 91/08 | 114/255 |
| 5,037,235 A * | 8/1991 | Aquilina | B25G 1/04 | 16/427 |
| 5,193,932 A * | 3/1993 | Wu | E04C 5/165 | 403/307 |
| 5,295,408 A * | 3/1994 | Nagle | F16C 1/105 | 74/501.5 R |
| 5,458,305 A * | 10/1995 | Woodward | A61M 5/1415 | 248/121 |
| 5,598,743 A * | 2/1997 | Yasuda | F16C 1/14 | 403/11 |
| 5,622,443 A * | 4/1997 | Lampert | A63B 21/0552 | 403/291 |
| 5,921,196 A * | 7/1999 | Slatter | A01K 91/08 | 114/255 |
| 5,924,235 A * | 7/1999 | McCulley | A01K 87/02 | 403/334 |
| 5,974,722 A * | 11/1999 | Kiser | A01K 97/01 | 43/18.1 CT |
| 5,992,804 A * | 11/1999 | Johnson | B63B 29/06 | 114/363 |
| 6,061,946 A * | 5/2000 | Toelken | A01K 87/007 | 362/109 |
| 6,123,035 A * | 9/2000 | Pfister | A47B 87/0223 | 108/147.13 |
| 6,637,363 B2 * | 10/2003 | Schmitt | B63B 19/02 | 114/343 |
| 6,908,249 B2 * | 6/2005 | Tomm | B25G 1/04 | 403/109.1 |
| 7,025,015 B2 * | 4/2006 | Wilcox | A01K 91/08 | 114/255 |
| 7,111,574 B2 * | 9/2006 | Slatter | A01K 91/08 | 114/255 |
| 7,461,476 B1 * | 12/2008 | Davis | A01K 87/002 | 43/18.1 CT |
| 7,814,812 B1 * | 10/2010 | Ziegahn | B62K 21/26 | 16/421 |
| 7,913,442 B2 * | 3/2011 | Roth | A01K 87/04 | 43/24 |
| 8,347,546 B2 * | 1/2013 | Rupp | A01K 87/025 | 248/255 |
| 8,422,716 B2 * | 4/2013 | Wetzel | F16B 7/14 | 248/337 |
| 8,586,881 B1 * | 11/2013 | Shemtov | F16L 19/061 | 174/652 |
| 8,656,632 B1 * | 2/2014 | Mercier | A01K 91/08 | 43/27.4 |
| 8,683,735 B1 * | 4/2014 | Figari | A01K 91/08 | 43/18.1 CT |
| 9,504,239 B2 * | 11/2016 | Stender | A01K 87/025 | |
| 9,562,637 B1 * | 2/2017 | Crompton | F16L 21/007 | |
| 9,777,873 B1 * | 10/2017 | Crompton | F16L 17/02 | |
| 9,920,867 B1 * | 3/2018 | Shemtov | F16L 19/083 | |
| 9,995,419 B1 * | 6/2018 | Shemtov | F16L 19/0206 | |
| 10,337,547 B2 * | 7/2019 | Onorato | A01K 91/08 | |
| 10,470,451 B2 * | 11/2019 | Onorato | A01K 87/04 | |
| 2002/0172548 A1 * | 11/2002 | Chang | B25G 3/22 | 403/305 |
| 2004/0016385 A1 * | 1/2004 | Wilcox | A01K 91/08 | 114/255 |
| 2006/0231009 A1 * | 10/2006 | Slatter | A01K 91/08 | 114/255 |
| 2010/0303540 A1 * | 12/2010 | Kim | E04C 5/165 | 403/305 |
| 2012/0294673 A1 * | 11/2012 | Anderson, III | F16D 1/05 | 403/314 |
| 2015/0323050 A1 * | 11/2015 | Ohno | F16H 25/20 | 74/434 |
| 2016/0001851 A1 * | 1/2016 | Kardas | B63B 17/04 | 114/364 |
| 2017/0071178 A1 * | 3/2017 | Serocki | A01K 91/08 | |

(56) References Cited

U.S. PATENT DOCUMENTS

2018/0014522 A1* 1/2018 Bridgewater ......... F16B 7/1418
2019/0072216 A1* 3/2019 Kang .................... F16L 21/007

FOREIGN PATENT DOCUMENTS

| GB | 684671 A | * | 12/1952 | ........... A01K 87/025 |
| JP | 08051895 A | * | 2/1996 | |
| JP | 2001057829 A | * | 3/2001 | |
| JP | 2001069879 A | * | 3/2001 | |
| JP | 2006191833 A | * | 7/2006 | |

OTHER PUBLICATIONS

Third-Party Submission Under 37 CFR 1.290, dated Nov. 3 2017, 2 pages.
Taco Marine Sport Fishing—Product Specification for Carbon Fiber Center Rigger Pole (p. 1) and Carbon Fiber Tele-Outrigger Pole (p. 2), dated Feb. 9, 2015, 6 pages.

* cited by examiner

OUTRIGGER CLAMP WITH ATTACHMENT POINT

CROSS REFERENCES TO RELATED APPLICATIONS

This application is a continuation-in-part and claims the benefit of U.S. patent application Ser. No. 15/214,006, filed Jul. 19, 2016, entitled Outrigger Clamp, which is a continuation-in-part and claims the benefit of U.S. patent application Ser. No. 14/863,964, filed Sep. 24, 2015, entitled Outrigger Clamp, both of the contents of which are incorporated herein by reference in their entirety.

TECHNICAL FIELD OF THE INVENTION

The present invention relates generally to clamps. More particularly, the present invention relates to an outrigger clamp with a filament guide and an accessory attachment point that rotates about an axis of the clamp.

BACKGROUND OF THE INVENTION

Outriggers are popular in fishing applications. Outriggers are rigid poles that are a part of the boats rigging and are designed to extend the fishing pole bait lines beyond the "white wash" of the water surrounding the boat. This is preferable because bait traveling through clear water is more likely to successfully attract a fish. Once a fish takes the bait, the line is automatically released from the outrigger and all forces are transferred directly to a fishing pole secured to the gunnel of the boat. For example, the bait line can be connected to a quick release mechanism that releases the line and transfers the forces to the pole when a fish engages the bait or otherwise pulls on the line.

Outriggers typically include several tubes connected to one another by clamps. The clamps can secure the tubes together when the outrigger is arranged in the extended position to prevent the tubes from collapsing upon one another. Also, the clamps can be engaged when arranged in a collapsed position to prevent the tubes from extending.

Outriggers typically include clamps with guides that retain a filament. The filament can pass through the guides and connect to the quick release mechanism to extend the bait line a desired distance from the boat when the outrigger is in the extended position. The guides are preferably oriented parallel to one another. In doing so, the force applied to the filament by the bait line is coplanar with the axis of the clamp at a point furthermost from the boat, allowing a more structurally stable configuration.

Current outrigger models require manual manipulation to retain the position of the clamp guides. For example, before engaging the clamps, a user must use their hands to rotate the tubes to properly align the guides of each clamp. In addition, conventional outrigger clamps and guides do not prevent the filament from becoming tangled, requiring the filament to be released and either untangled or replaced.

SUMMARY OF THE INVENTION

The present invention broadly comprises an outrigger clamp capable of securing two or more nestable tubes. The clamp includes a guide with a retainer that retains a filament of the outrigger, and an attachment point adapted to receive accessories without interfering with the guide or retained filament. The guide and attachment point can rotate about an axis of the outrigger based on the forces applied to the filament without affecting the connection between the nestable tubes. The clamp can also include a retainer, for example, rollers, that retains the filament in a manner to prevent creases and kinks in the filament. The outrigger clamp can adequately align the guides holding the filament without extensive manual manipulation, and helps prevent the filament from becoming creased or kinked during use. Further, the attachment point allows a user to use the outriggers for a number of different applications without requiring the user to uninstall and reinstall the filament from the guide.

In an embodiment, the present invention broadly includes a clamp including a body having opposing first and second ends, a first cap coupled to the body at the first end to form a first clamping mechanism adapted to receive a first work piece, and a second cap coupled to the body at the second end to form a second clamping mechanism adapted to receive a second work piece and couple the second work piece to the first work piece. A guide is disposed between the second cap and the body and is adapted to rotate about an axis of the body. In addition, the guide includes an attachment point adapted to receive an accessory. Further, the clamp includes a first split ring having opposing first and second chamfers and a split ring gap extending axially along a periphery of the split ring, the first chamfer engages the first cap and reduces the size of the gap as the first cap is coupled to the body.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
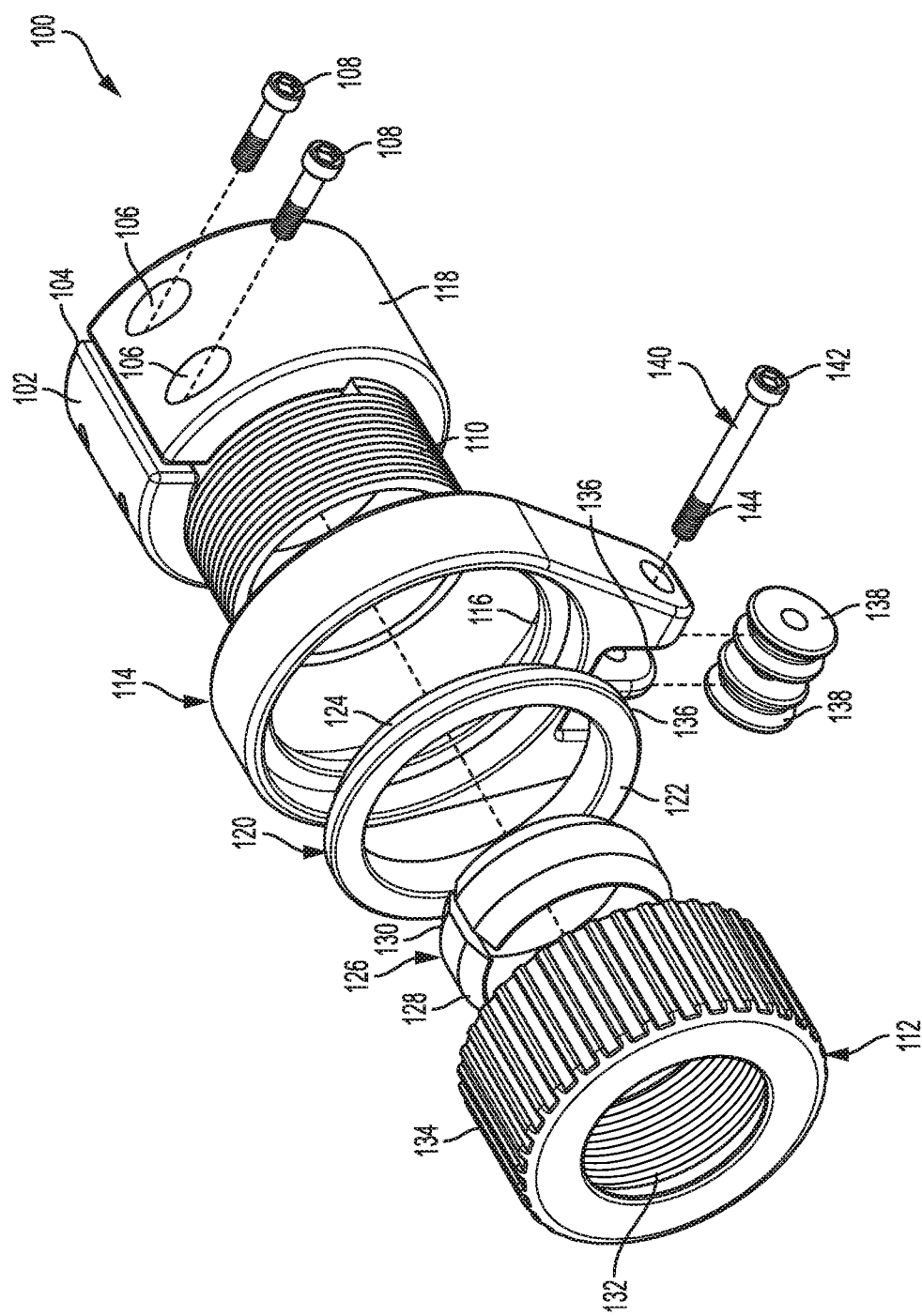
FIG. 1 is a top, perspective, exploded view of a clamp according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises an outrigger clamp that couples together a pair of nestable tubes. The clamp can include a guide for filament that connects to a quick release mechanism. The guide can rotate about an axis of the outrigger when forces are applied to the filament and, in doing so, rotate to align the filament. Aligning of the filament helps prevent tangling of the filament and fishing line and directs forces on the outrigger in a structurally stable manner, without affecting the connection between the nestable tubes. The clamp can also include a retainer that retains the filament without causing the filament to crease or kink. In addition, the guide can include an attachment point that is adapted to receive accessories to be used with the guide without interfering with the retained filament.

Referring to FIGS. 1-5, a clamp 100 can include a body 102 having a gap 104 to allow the body to flex in a radial direction when receiving a nestable tube. For example, the body 102 can receive the larger of two nestable tubes and the larger tube can press the body 102 outwardly in a radial direction. The body 102 can, therefore, compress the larger nestable tube and secure the tube in position. For example, the body 102 can include holes 106 for receiving fasteners 108, such as bolts or screws, to couple the larger nestable tube within the body 102. The fasteners 108 can connect to internal threads within the body 102 and close the gap 104 when further inserted into the body 102. Typically, a user would not adjust the body 102 during use of the clamp 100, but would use a different mechanism to couple the clamp 100 in the extended or collapsed positions. However, the present invention is not limited to such a method, and a user can adjust the body 102 freely during use if so desired.

The body 102 can be coupled to a threaded portion 110 that, in turn, is threadably coupled to a cap 112. For example, the user can rotate the cap along the threads of the threaded portion 110 and couple the smaller nestable tube to the larger nestable tube already secured within the body 102. In this manner, the combination of the body 102, gap 104, holes 106, and fasteners 108 is one example of a first clamping mechanism that applies a radial compressive force, as discussed herein. However, other structures can be implemented as the first clamping mechanism without departing from the spirit and scope of the present invention.

A guide 114 can be positioned on the body 102 and rotatable about an axis of the clamp 100. For example, the guide 114 can include an inner ring 116 having a first side facing the body 102 and a second side opposite the first side. The first side can abut an outer face 118 of the body 102 and freely rotate about the axis of the clamp 100. As discussed below, this free rotation of the guide 114 allows the outrigger and filament to align themselves during use. Forces on the bait line, outrigger, and filament can therefore be aligned with one another and allow for a more structurally stable configuration. Also, a user need not manually adjust the guide 114 because the force of the filament will automatically cause the guide 114 to align properly.

A lock ring 120 can be positioned adjacent the guide 114 in the axial direction of the clamp 100. The lock ring 120 can be fixed to the body 102 by, for example, threads, to prevent the guide 114 from moving in the axial direction of the clamp 100. The lock ring 120 can include a flange 122 extending around a periphery of the lock ring 120, and a base 124 extending in the axial direction with an outer diameter less than the outer diameter of the flange 122. The flange 122 may abut against the second side of the guide 114 when the clamp 100 is assembled to substantially prevent axial movement, but allow rotational movement, of the guide 114.

The lock ring 120 may include or couple with a friction member that presses against the guide 114 to prevent rotation of the guide 114 due to the force of gravity. For example, the friction member can supply enough frictional resistance to substantially prevent the guide 114 from rotating about the body 102 due to gravity, but allow the guide 114 to rotate about the body 102 when a more sufficient external force is applied. The frictional member can therefore allow forces on the outrigger and bait line to align the guides 114 of the outrigger, without necessarily allowing movement of the guides 114 due to gravity.

A split ring 126 can be disposed proximate the threaded portion 110, for example, in a chamfer located in the threaded portion 110, as discussed below. The split ring 126 can include opposing first 128 and second chamfers 130. The split ring 126 can be discontinuous and includes a gap extending both through the split ring 126 and axially with respect to the split ring 126 to allow for flexing of the split ring 126, similar to the body 102 and gap 104 discussed above. The split ring 126 can flex and apply a compressive force against the smaller of two nestable tubes of the outrigger. For example, the internal diameter of the split ring 126 can compress the outside periphery of the smaller of the two nestable tubes when the cap 112 is rotated to be inserted on the threaded portion 110. In particular, the cap 112 can push against the first chamfer 128, causing the second chamfer 130 to push against the threaded portion 110, and thereby close the gap in the split ring 126. By closing the gap in the split ring 126, the diameter of the split ring 126 decreases and causes a compressive force to be applied to the smaller of the two nestable tubes, and the smaller tube can be coupled to the larger tube, already positioned within the first clamping mechanism. In this manner, the combination of the cap 112 and split ring 126 is one example of a second clamping mechanism that provides an axial compressive force, as described in this application. However, other clamping mechanisms can be implemented as the second clamping mechanism without departing from the spirit and scope of the present invention.

The cap 112 can include an opening 132 defined on an axial-most end of the clamp 100, and can further include grips 134 for a user to grip to tighten the clamp 100. The opening 132 can be any size that allows the smaller of the two nestable tubes to extend axially outward from the clamp 100 through the opening 132. As shown, the grips 134 are a series of ribs to allow easy rotation of the clamp 100; however, any structure can be implemented as the grips 134 without departing from the spirit and scope of the present application.

The guide 114 can include one or more receiving areas 136 to receive a retainer 138. The receiving areas 136 and/or the retainer 138 can receive and retain a filament of the outrigger and align the filament and other clamps 100 along the outrigger axis. For example, the retainer 138 can be one or more rollers that allow the filament to move axially along the roller. Because the roller is round, the filament can gently engage the guide 114 without creasing or crimping, compared to a more rigid hook or fish eye fastener. As shown, two retainers 138 are disposed in respective receiving areas 136. However, more or fewer retainers 138 and receiving areas 136 can be implemented without departing from the spirit and scope of the present application. For example, the number of retainers can be dependent on the size of the nestable tubes coupled together by the clamp 100. In some embodiments, the larger the tubes, the more retainers 138 disposed on the guide 114.

As shown, the retainers 138 can be coupled to the guide 114 by a shaft 140 having a head 142 and a threaded end 144. The head 142 can be rotatable by a tool, for example an Allen wrench, socket wrench, or screwdriver, and can insert into the guide 114. For example, the threaded end 144 of the shaft 140 can insert into internal threads of the guide 114, or can extend through the guide 114 and couple to a nut at the opposite end of the guide 114.

Figure 2:
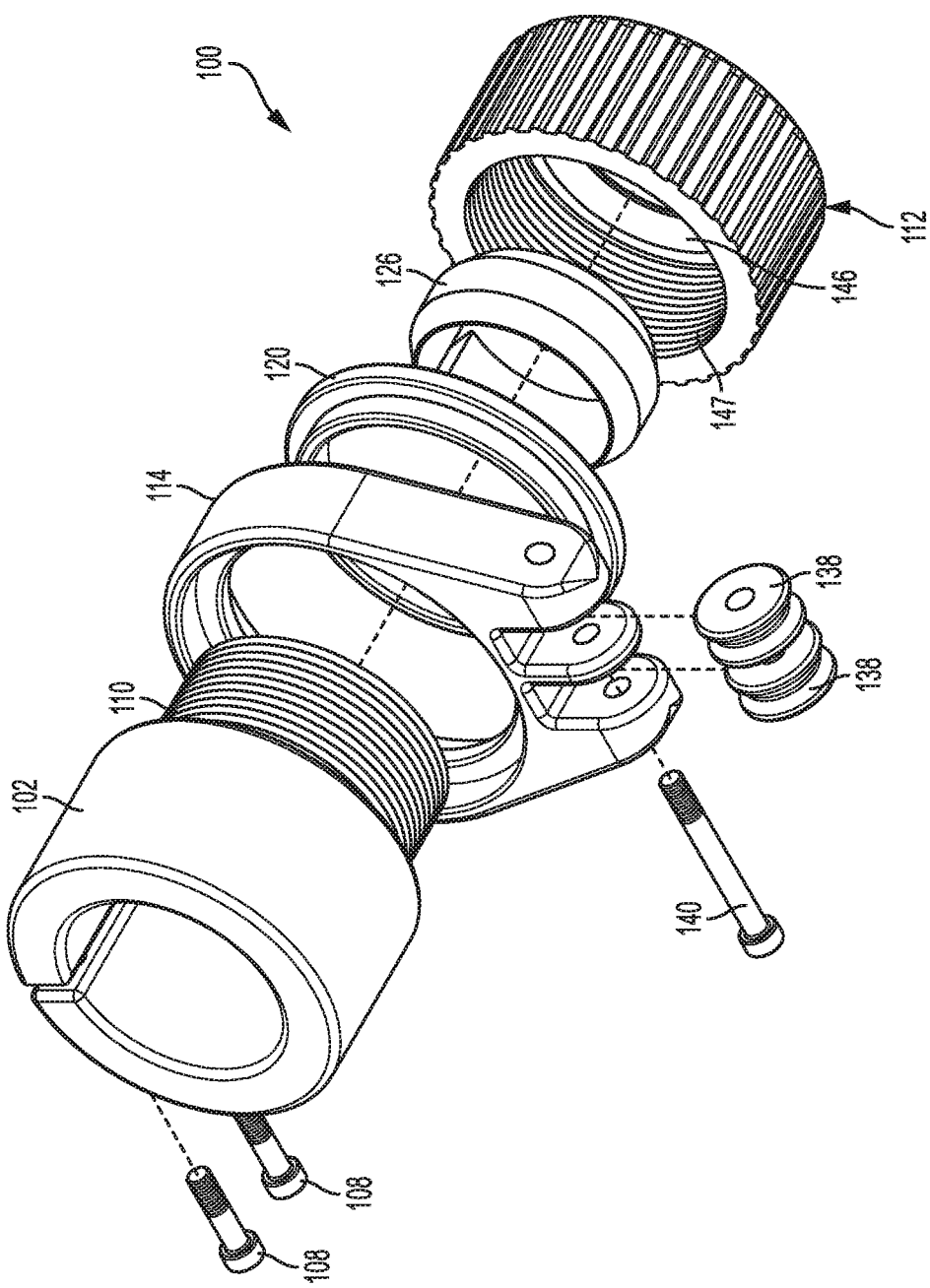
FIG. 2 is a bottom, perspective, exploded view of the clamp according to FIG. 1.
Figure 3:
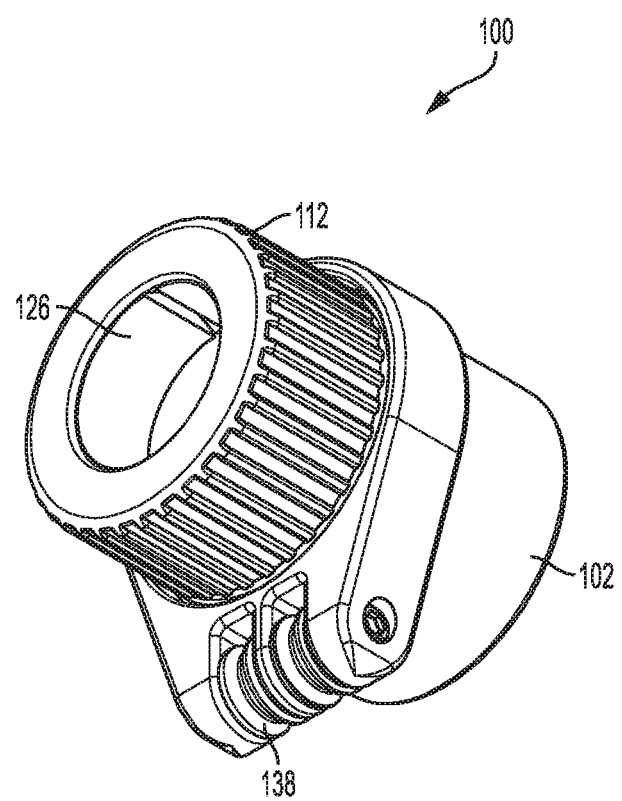
FIG. 3 is a bottom, perspective, assembled view of the clamp according to FIG. 1.
Figure 4:
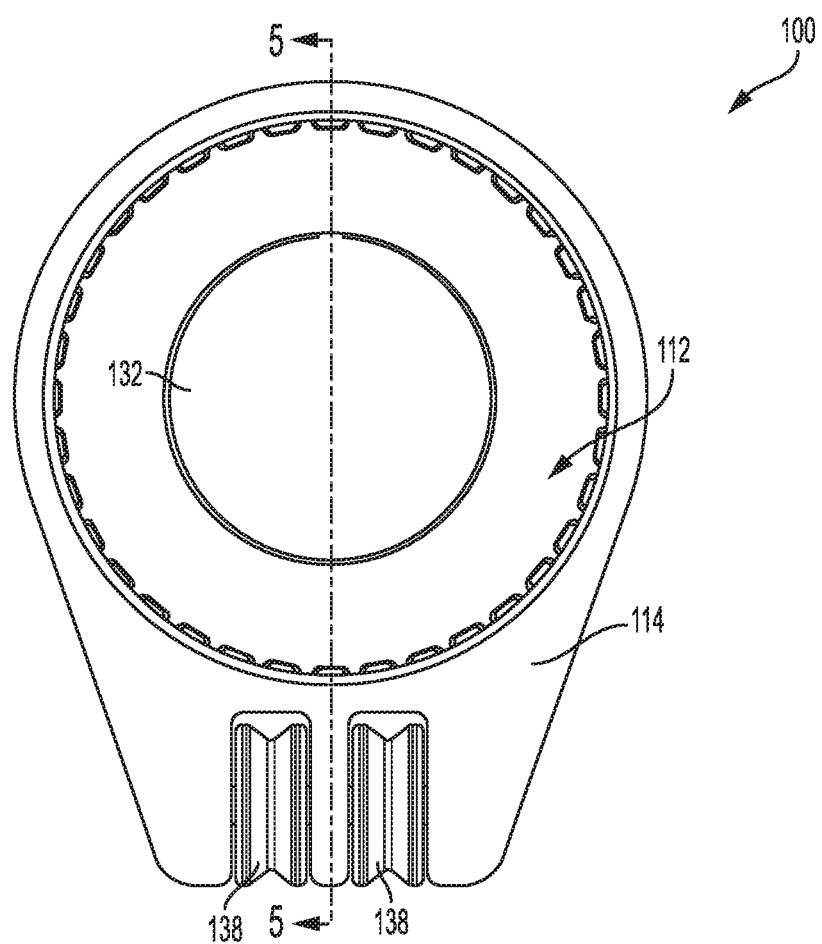
FIG. 4 is a front elevation view of the clamp according to FIG. 1.
Figure 5:
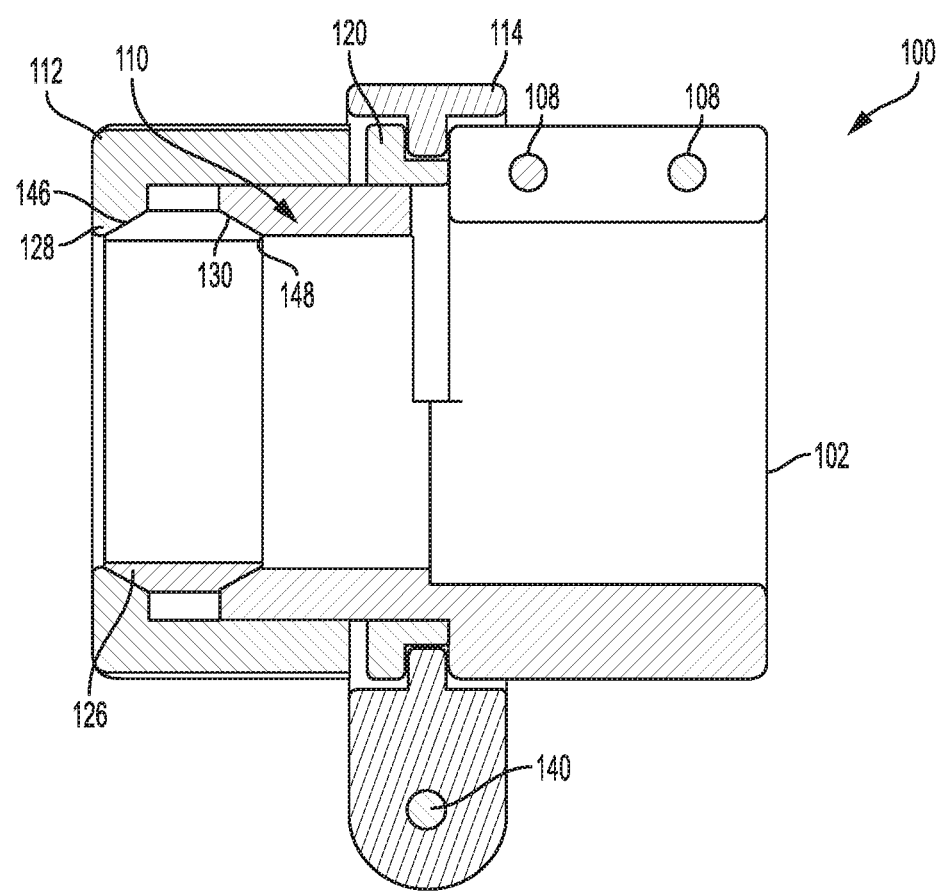
FIG. 5 is a sectional view of the clamp of FIG. 4, taken along line 5-5 of FIG. 4.

FIG. 2 illustrates a cap chamfer 146 and internal threads 147 of the cap 112. Further, FIG. 5 illustrates a threaded portion chamfer 148. As shown, the split ring 126 can be compressed by rotating the cap 112 to insert the cap 112 onto the threaded portion 110. When the cap 112 is inserted onto the threaded portion 110, the cap chamfer 146 pushes against the first chamfer 128 of the split ring 126, and the threaded portion chamfer 148 pushes against the second chamfer 130 of the split ring 126. The compressive forces from the cap chamfer 146 and threaded portion chamfer 148 cause the split ring 126 to close upon its gap, thus decreasing in diameter and applying a compressive force from the inner portion of the split ring 126 to the outer periphery of the smaller nestable tube. The compressive force from the split ring 126 therefore couples the smaller nestable tube with the larger nestable tube, already coupled within the first clamping mechanism.

Figure 6:
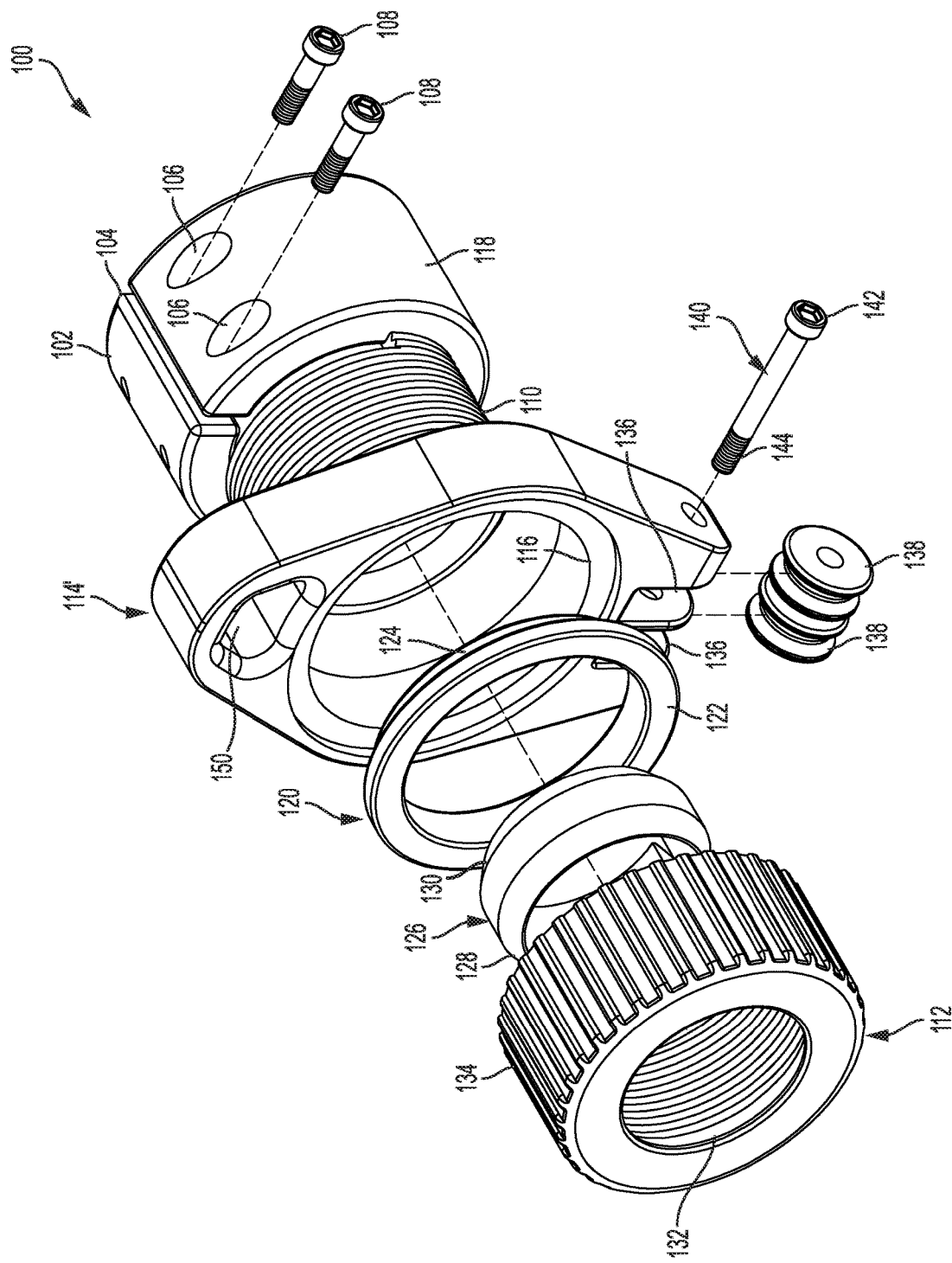
FIG. 6 is top, perspective, exploded view of another embodiment of the clamp according to FIG. 1 including an attachment point according to the present invention.

In another embodiment, the invention may include a clamp that includes an attachment point that allows a user to couple one or more accessories to the clamp without interfering with the guide or filament retained by the guide/retainer. Referring to FIG. 6, the clamp 100 (as described above with reference to FIGS. 1-5) may include a guide 114' (similar to guide 114) with an attachment point 150 adapted to receive accessories. The attachment point 150 can be used to attach one or more accessories to the guide 114', such as, for example, with a hook ring, D-clip or other well-known means. As shown, one attachment point 150 is disposed in or on the guide 114'. However, more attachment points 150 can be implemented without departing from the spirit and scope of the present invention. For example, the number of attachment points 150 can be dependent on the number of accessories to be attached to the guide 114'.

Further, as shown, the attachment point 150 is disposed on a side of the guide 114' opposite the receiving areas 136 and retainers 138. However, the attachment point 150 may be positioned anywhere along or around the guide 114' so that the attachment point 150 does not interfere with the filament of the outrigger. In addition, a shape of the attachment point 150 may be any shape that allows for attachment of an accessory. For example, the attachment point 150 may be a substantially round shape, a substantially rectangular shape, a substantially triangular shape, a substantially trapezoidal shape, or any other geometric shape.

Some examples of accessories that can be attached to the attachment point 150 are, but are not limited to, lights, a flag, or clips or tethers for other accessories, etc. The accessories may be attached to the attachment point 150 using a number of different methods. Some methods that may be used include, but are not limited to, clipping the accessory to the attachment point 150 or tying the accessory to the attachment point 150.

The attachment point 150 allows a user to attach accessories to the guide 114' without interfering with the retained filament. This allows the user to utilize an outrigger for a variety of applications without requiring the user to go through the time-consuming process of uninstalling and reinstalling the retained filament.

In another embodiment, the invention may include a clamp that includes two similar clamping mechanisms (for example, using split rings and caps, similar to those described above) on either end to couple the two nestable tubes together. Referring to FIGS. 7-11, a clamp 200 includes a coupling portion 202 (also referred to as a body), a first cap 204 and first split ring 206, a second cap 208 and second split ring 210, and a guide 212.

Figure 7:
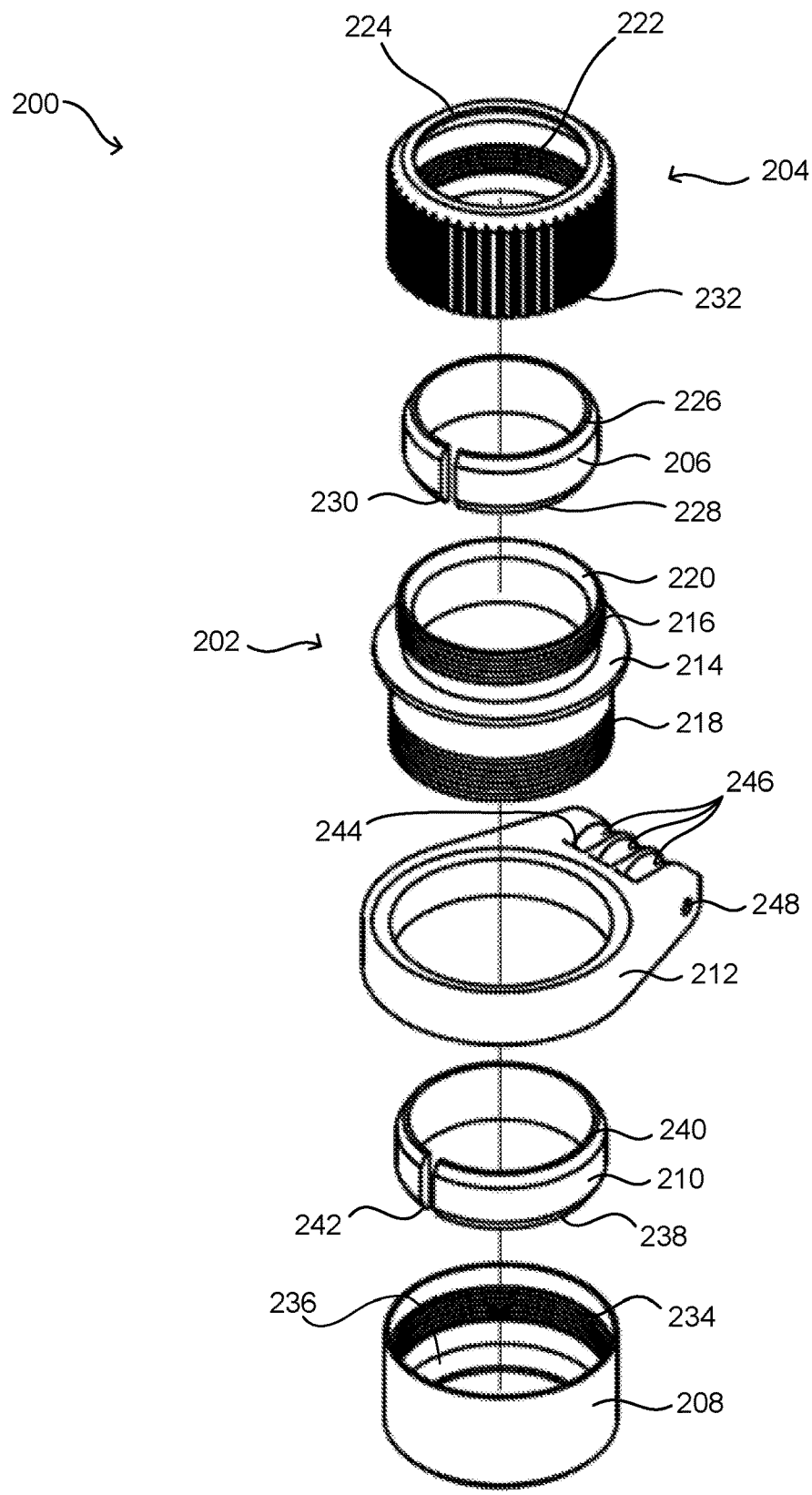
FIG. 7 is an exploded view of a clamp according to another embodiment of the present invention.
Figure 8:
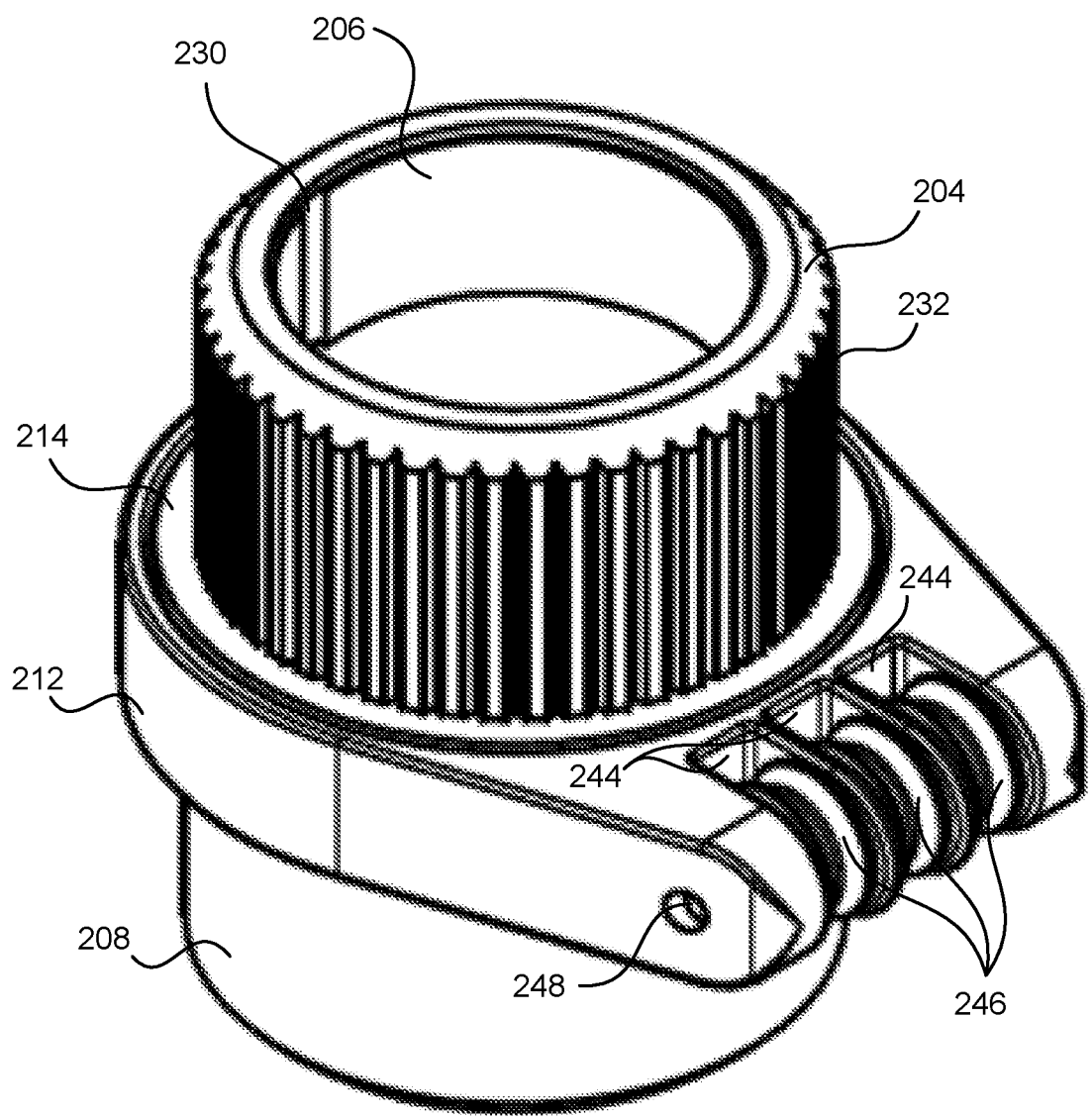
FIG. 8 is a first, perspective, assembled view of the clamp according to FIG. 7.
Figure 9:
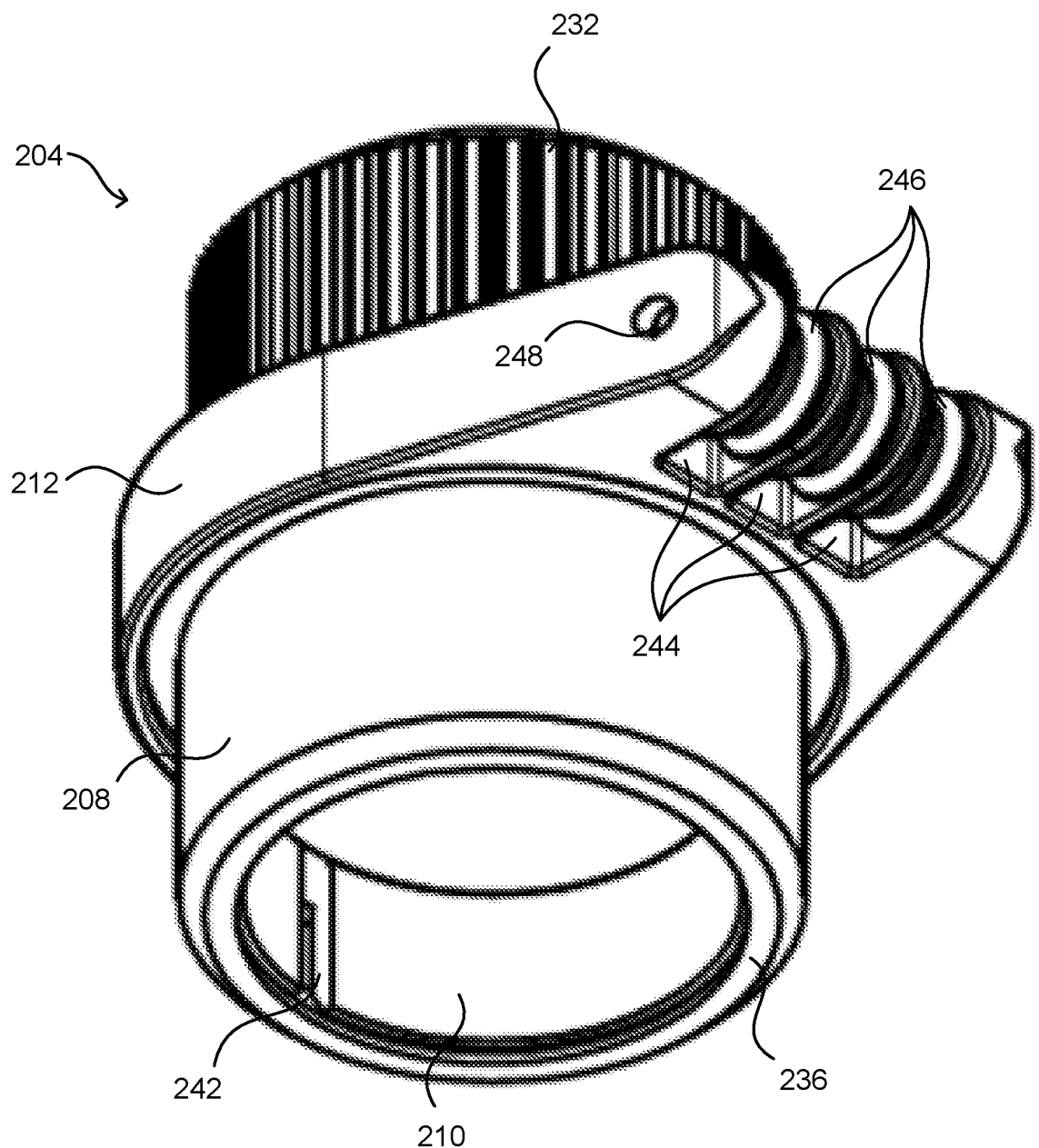
FIG. 9 is a second, perspective, assembled view of the clamp according to FIG. 7.
Figure 10:
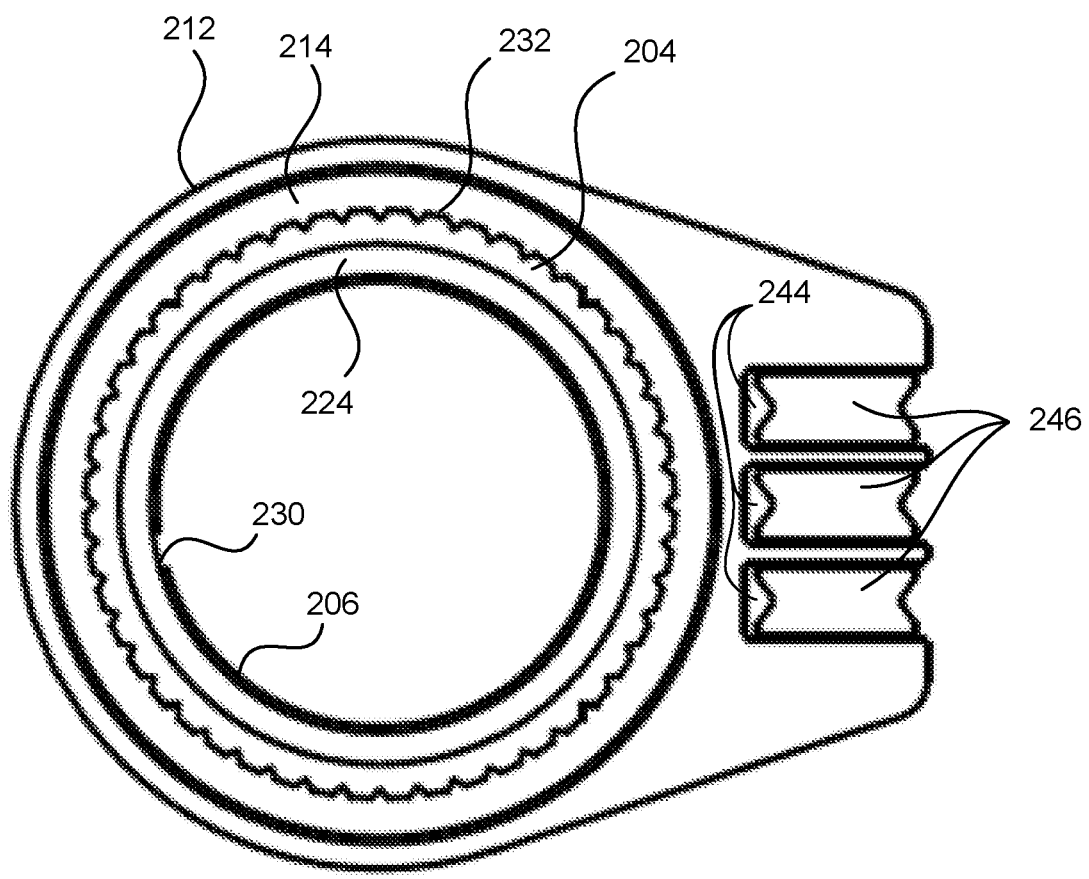
FIG. 10 is a first, axial, assembled view of the clamp according to FIG. 7.
Figure 11:
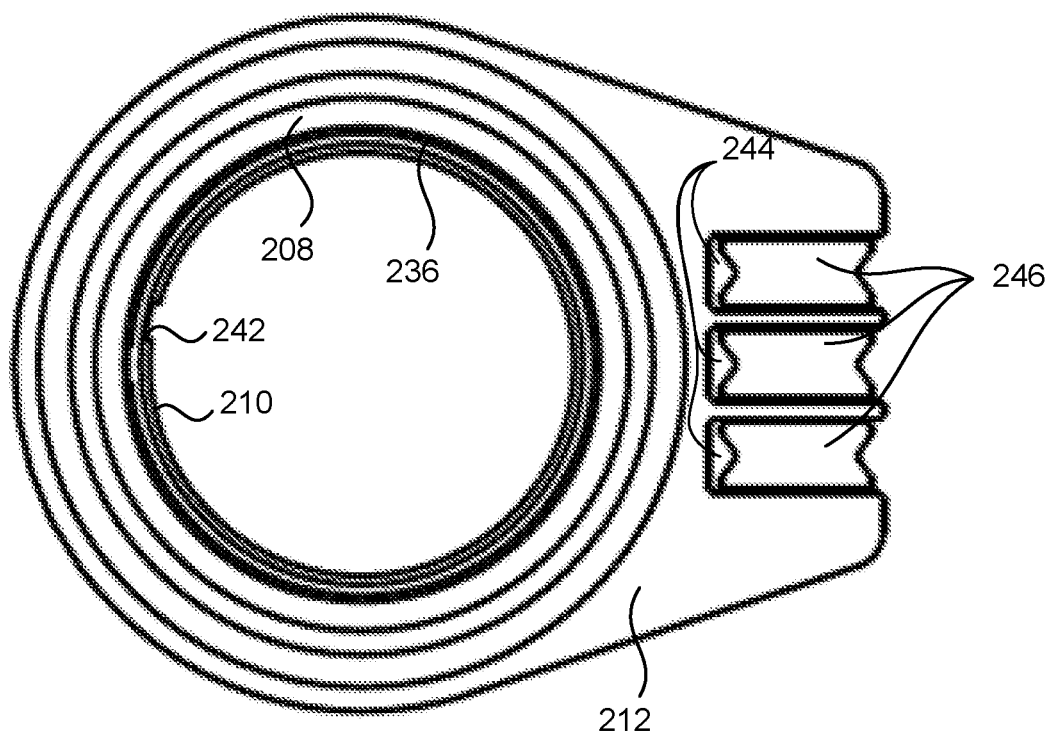
FIG. 11 is a second, axial, assembled view of the clamp according to FIG. 7.
Figure 12:
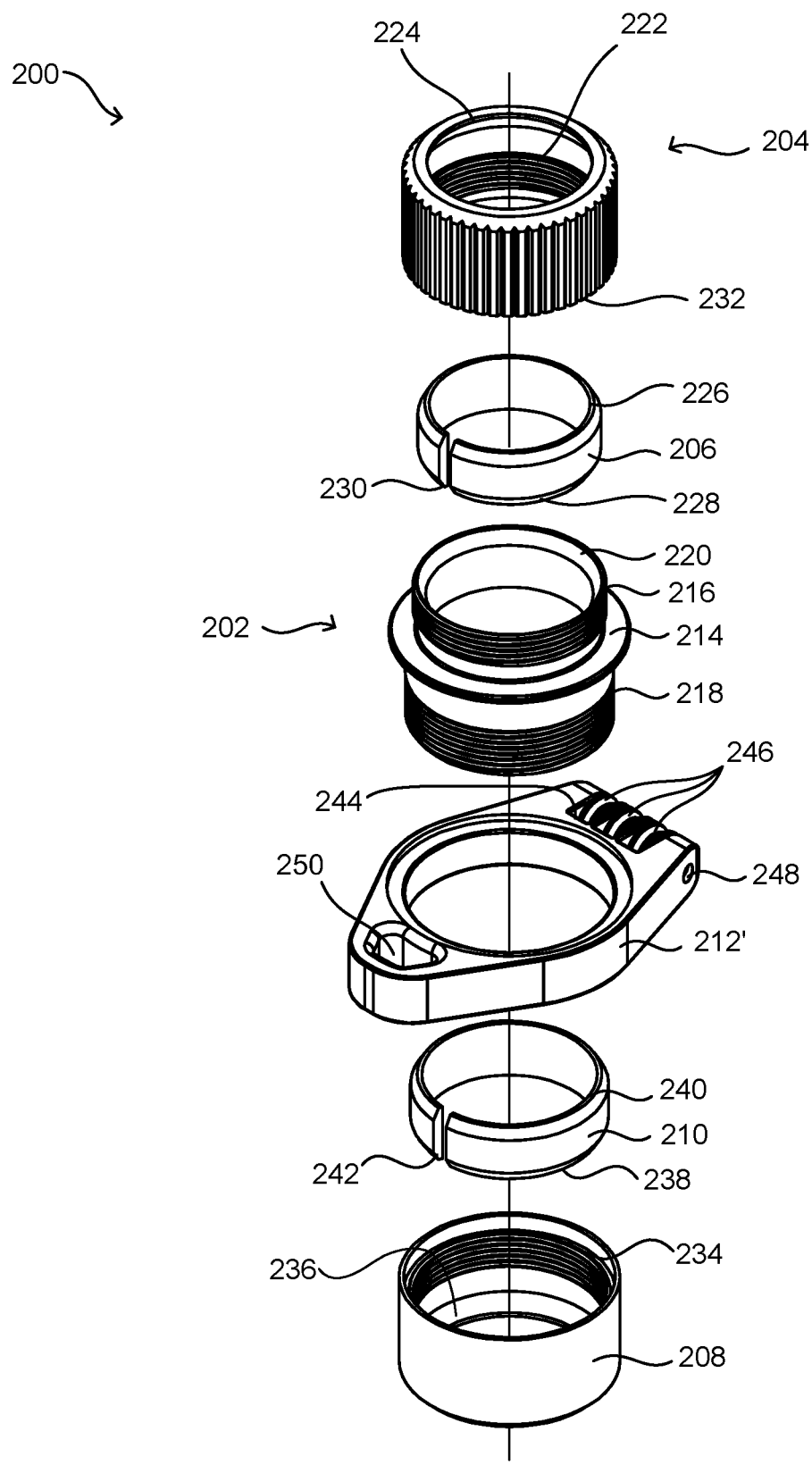
FIG. 12 is an exploded view of another embodiment of the clamp according to FIG. 7 including an attachment point according to the present invention.
Figure 13:
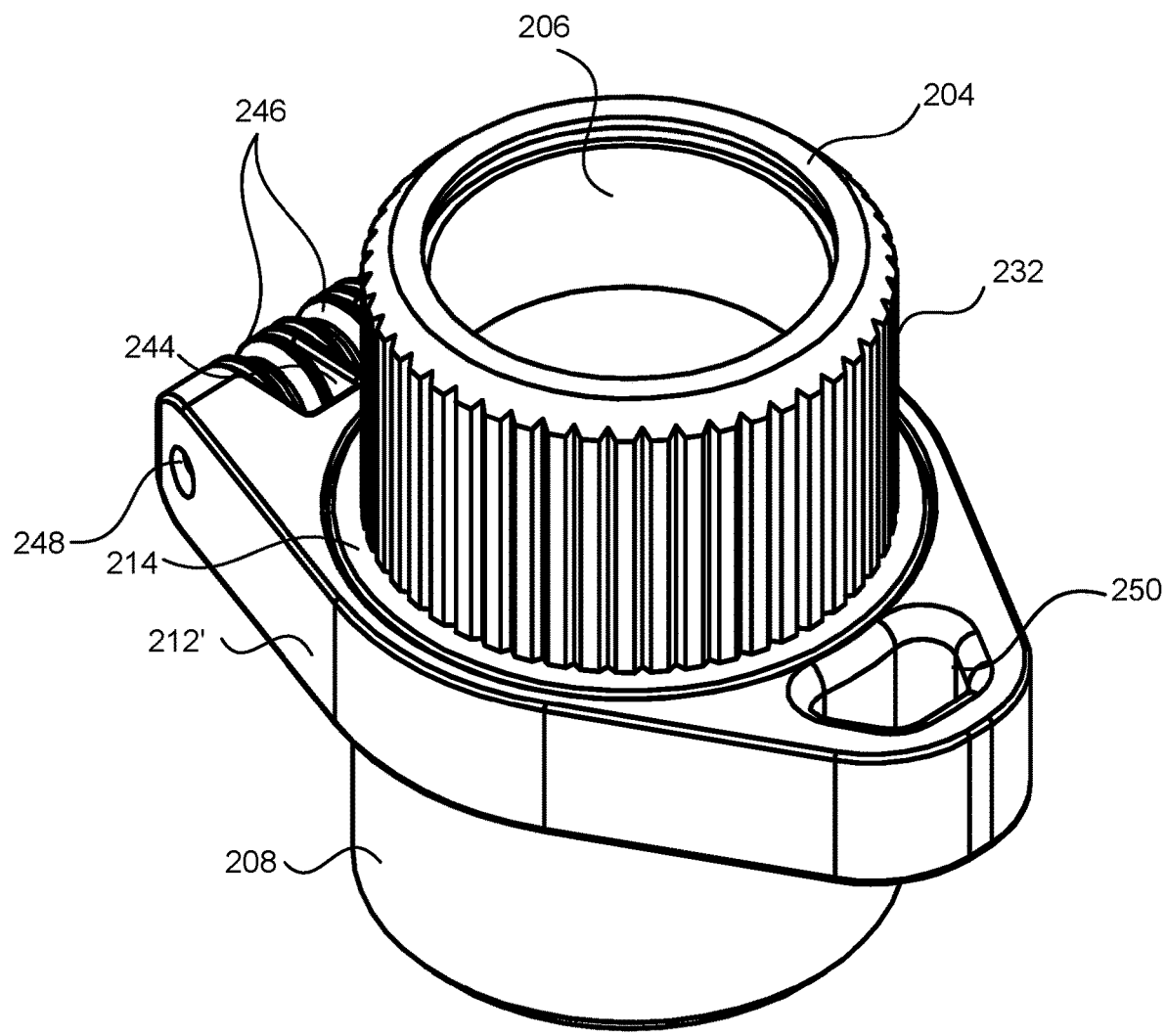
FIG. 13 is a first, perspective, assembled view of the clamp according to FIG. 12.
Figure 14:
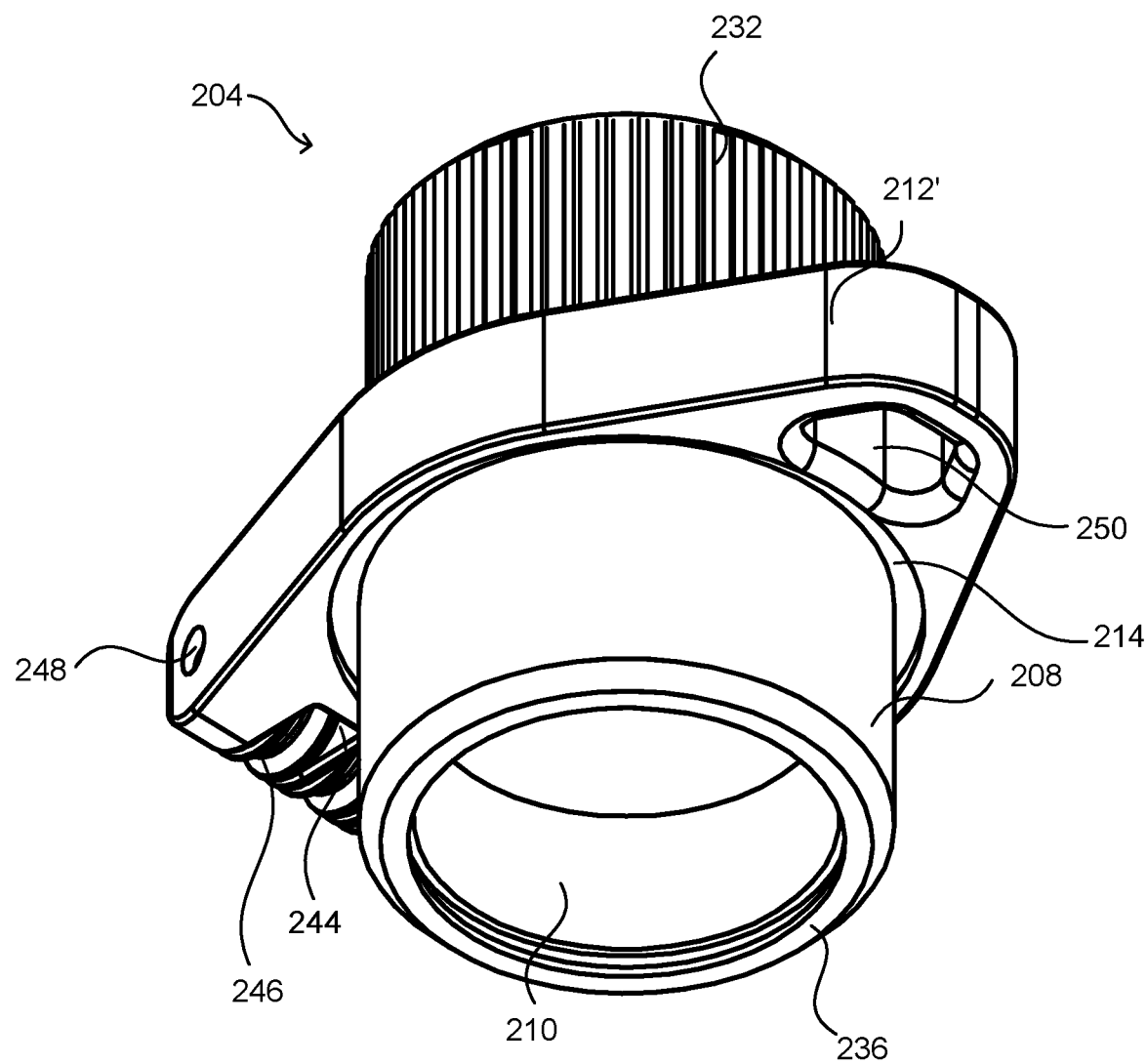
FIG. 14 is a second, perspective, assembled view of the clamp according to FIG. 12.
Figure 15:
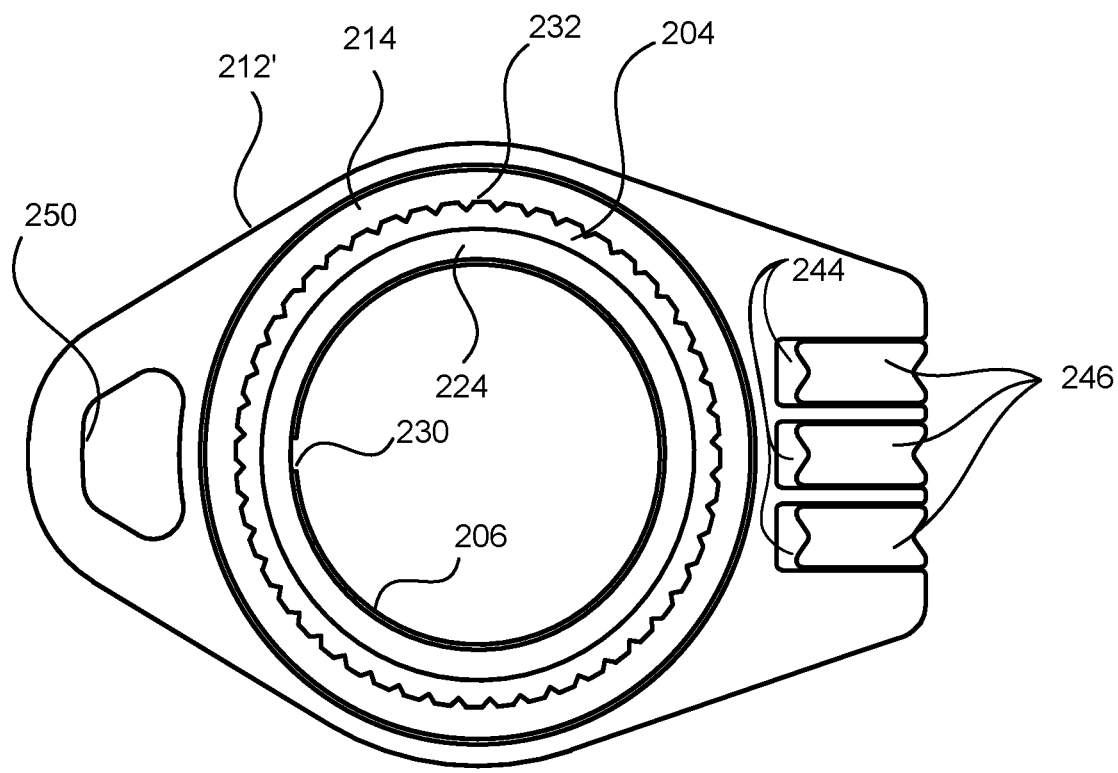
FIG. 15 is a first, axial, assembled view of the clamp according to FIG. 12.
Figure 16:
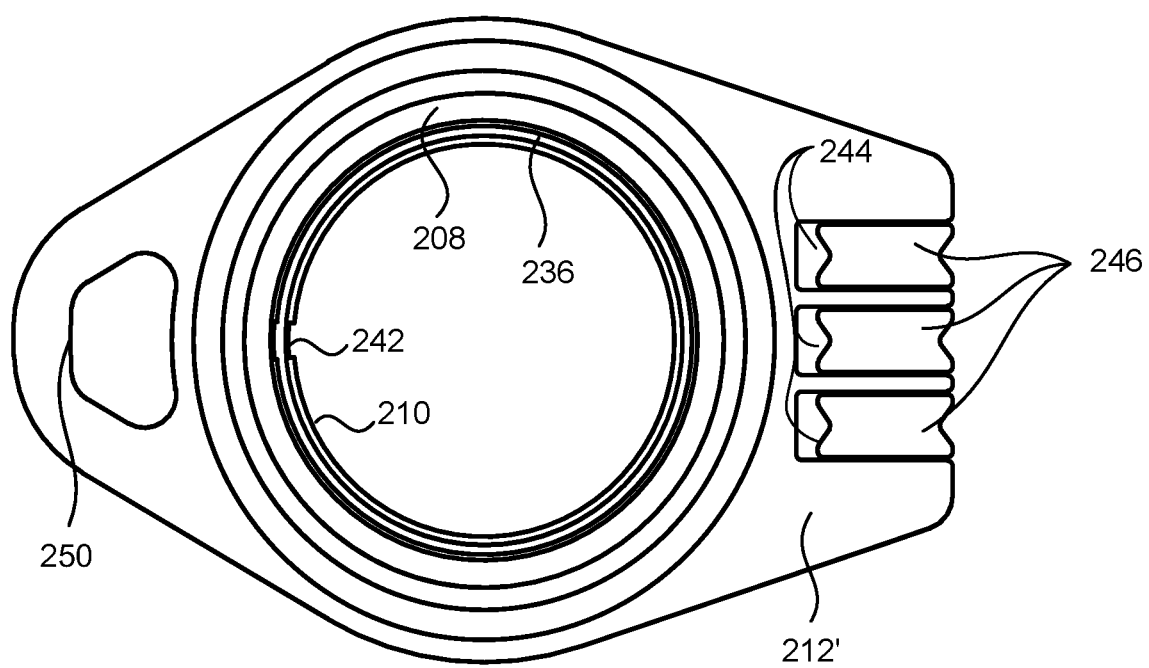
FIG. 16 is a second, axial, assembled view of the clamp according to FIG. 12.

The coupling portion 202 includes first and second opposing ends and a flange portion 214 extending circumferentially around the coupling portion 202 between the first and second ends. A first threaded portion 216 extends in a first axial direction from the flange portion 214 to the first end of the coupling portion 202, and a second threaded portion 218 extends in a second axial direction, opposite the first axial direction) from the flange portion 214 to the second end of the coupling portion 202. As illustrated in FIG. 7, the first and second threaded portions 216 and 218 include external threads, respectively. The first and second threaded portions 216 and 218 may also include respective first and second chamfers (the first chamfer is illustrated as 220, and the second chamfer is not illustrated but is substantially identical to the first chamfer).

The first cap 204 includes internal threads 222 and a first cap chamfer 224 proximal to an end of the first cap 204. The first split ring 206 can also include opposing first and second ring chamfers 226 and 228, respectively. The first split ring 206 can be discontinuous and includes a gap 230 extending both through the first split ring 206 and axially with respect to the first split ring 206 to allow for flexing of the first split ring 206. The first split ring 206 can flex and apply a compressive force against an outside periphery of a first of two nestable tubes of the outrigger. For example, the first split ring 206 can be disposed proximate the first threaded portion 216, for example, with the second ring chamfer 228 engaged with the first chamfer 220 of the coupling portion 202. The first cap 204 may then be threaded onto the first threaded portion 216 of the coupling portion 202, thereby engaging the first cap chamfer 224 with the first ring chamfer 228.

As the first cap 204 is threaded onto the first threaded portion 216, the first cap chamfer 224 pushes against the first ring chamfer 228, and the second ring chamfer 228 pushes against the first chamfer 220 of the coupling portion 202, causing the gap 230 in the split ring 206 to close. By closing the gap 230, the diameter of the first split ring 206 decreases and causes a compressive force to be applied to the first of the two nestable tubes when the tube is inserted into the first cap 204, the first split ring 206, and the first threaded portion 216 of the coupling portion 202. In this manner, the combination of the first cap 206 and first split ring 206 is one example of a first clamping mechanism that provides an axial compressive force, as described in this application. However, other clamping mechanisms can be implemented as the first clamping mechanism without departing from the spirit and scope of the present invention.

The first cap 204 can further include grips 232 for a user to grip to tighten the first clamping mechanism. As shown, the grips 232 are a series of circumferentially disposed ribs to allow easy rotation of the first cap 204; however, any structure can be implemented as the grips 232 without departing from the spirit and scope of the present application.

The second cap 208 also includes internal threads 234 and a second cap chamfer 236 proximal to an end of the second cap 208. The second split ring 210 can also include opposing first and second ring chamfers 238 and 240, respectively. The second split ring 210 can be discontinuous and includes a gap 242 extending both through the second split ring 210 and axially with respect to the second split ring 210 to allow for flexing of the second split ring 210. The second split ring 210 can flex and apply a compressive force against an outside periphery of a second of two nestable tubes of the outrigger. For example, the second split ring 210 can be disposed proximate the second threaded portion 218, for example, with the second ring chamfer 240 engaged with the second chamfer (not shown) of the coupling portion 202. The second cap 208 may then be threaded onto the second threaded portion 218 of the coupling portion 202, thereby engaging the second cap chamfer 236 with the first ring chamfer 238.

As the second cap 208 is threaded onto the second threaded portion 218, the second cap chamfer 236 pushes against the first ring chamfer 238, and the second ring chamfer 240 pushes against the second chamfer (not shown) of the coupling portion 202, causing the gap 242 in the second split ring 210 to close. By closing the gap 242, the diameter of the second split ring 210 decreases and causes a compressive force to be applied to the second of the two nestable tubes when the tube is inserted into the second cap 208, the second split ring 210, and the second threaded portion 218 of the coupling portion 202. In this manner, the combination of the second cap 208 and second split ring 210 is one example of a second clamping mechanism that provides an axial compressive force, as described in this application. However, other clamping mechanisms can be implemented as the second clamping mechanism without departing from the spirit and scope of the present invention.

The second cap 208 can further include grips, such a series of ribs or other structure to allow easy rotation of the second cap 208.

The guide 212 can be positioned on the coupling portion 102, for example, by being disposed onto the second threaded portion 218 over the external threads of the second threaded portion 218, prior to the second cap 208 being threaded onto the second threaded portion 218. The guide 212 can be disposed against the flange 214 on an end proximate to the second threaded portion 218. The guide 212 can also be rotatable about an axis of the clamp 200. As discussed above with respect to the clamp 100, this free rotation of the guide 212 allows the outrigger and filament to align themselves during use. Forces on the bait line, outrigger, and filament can therefore be aligned with one another and allow for a more structurally stable configuration. Also, a user need not manually adjust the guide 212 because the force of the filament will automatically cause the guide 212 to align properly.

As mentioned above, the guide 212 can be disposed adjacent to the flange 214 in the axial direction of the clamp 200, to restrict the guide 212 from moving in the axial direction of the clamp 200, but allow rotational movement of the guide 212. The flange 214 and/or guide 212 may include or couple with a friction member that presses against the flange 214 and/or guide 212 to prevent rotation of the guide 212 due to the force of gravity. For example, the friction member can supply enough frictional resistance to substantially prevent the guide 212 from rotating about the body coupling portion 202 due to gravity, but allow the guide 212 to rotate about the coupling portion 202 when a more sufficient external force is applied. The frictional member can therefore allow forces on the outrigger and bait line to align the guides 212 of the outrigger, without necessarily allowing movement of the guides 212 due to gravity.

The guide 212 can include one or more receiving areas 244 to receive a retainer 246. The receiving areas 244 and/or the retainer 246 can receive and retain a filament of the outrigger and align the filament and other clamps 200 along the outrigger axis. For example, the retainer 246 can be one or more rollers that allow the filament to move axially along the roller. Because the roller is round, the filament can gently engage the guide 212 without creasing or crimping, compared to a more rigid hook or fish eye fastener. As shown, three retainers 246 are disposed in respective receiving areas 244. However, more or fewer retainers 246 and receiving areas 244 can be implemented without departing from the spirit and scope of the present application. For example, the number of retainers can be dependent on the size of the nestable tubes coupled together by the clamp 200. In some embodiments, the larger the tubes, the more retainers 246 are disposed on the guide 212. As shown, the retainers 246 can be coupled to the guide 212 by a shaft 248.

As illustrated, a first opening extending through the first cap 204, the first split ring 206 and into the first threaded portion 216 of the coupling portion 202 can be smaller in diameter than a second opening extending through the second cap 208, the second split ring 210 and into the second threaded portion 218 of the coupling portion 202. This allows for the clamp 200 to receive a smaller diameter tube in the first opening, and a larger diameter tube in the second opening to couple the two nestable tube together. However, it should be appreciated that the first and second opening may be switched. For example, the first opening extending through the first cap 204, the first split ring 206 and into the first threaded portion 216 of the coupling portion 202 can be larger in diameter than the second opening extending through the second cap 208, the second split ring 210 and into the second threaded portion 218 of the coupling portion 202.

In another embodiment, the invention may include a clamp 200 that includes an attachment point 250 that allows a user to couple one or more accessories to the clamp without interfering with the guide or filament retained by the guide/retainer. Referring to FIGS. 12-16, the clamp 200 (as described above with reference to FIGS. 7-11) may include a guide 212' (similar to guide 212) with an attachment point 250 adapted to receive accessories. The attachment point 250 can be used to attach one or more accessories to the guide 212', such as, for example, with a hook ring, D-clip or other well-known means. As shown, one attachment point 250 is disposed in or on the guide 212'. However, more attachment points 250 can be implemented without departing from the spirit and scope of the present invention. For example, the number of attachment points 250 can be dependent on the number of accessories to be attached to the guide 212'.

Further, as shown, the attachment point 250 is disposed on a side of the guide 212' opposite the receiving areas 244 and retainers 246. However, the attachment point 250 may be positioned anywhere along or around the guide 212' so that the attachment point 250 does not interfere with the filament of the outrigger. In addition, a shape of the attachment point 250 may be any shape that allows for attachment of an accessory. For example, the attachment point 250 may be a substantially round shape, a substantially rectangular shape, a substantially triangular shape, a substantially trapezoidal shape, or any other geometric shape.

As described above, some examples of accessories that can be attached to the attachment point 250 are, but are not limited to, lights, a flag, or clips or tethers for other accessories, etc. The accessories may be attached to the attachment point 250 using a number of different methods. Some methods that may be used include, but are not limited to, clipping the accessory to the attachment point 250 or tying the accessory to the attachment point 250. The attachment point 250 allows a user to attach accessories to the guide 212' without interfering with the retained filament, and without requiring the user to go through the time-consuming process of uninstalling and reinstalling the retained filament.

It should also be appreciated that the clamp 100 and the clamp 200 may be used in combination with one another.

As discussed herein, the present invention can be utilized with an outrigger, for example, coupling a first nestable tube to a second nestable tube. However, any two work pieces can be coupled together with the present invention, and not necessarily two nestable tubes or two other outrigger portions. Further, the present invention contemplates that the receiving areas 136/244 and/or retainers 138/246 can receive a filament. However, any type of line, such as a fishing line, filament, string, rope, or other object, can be received and retained without departing from the spirit and scope of the present invention.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. An outrigger clamp including first and second clamping mechanisms adapted to couple first and second work pieces together, comprising:
   a body having an axis;
   a lock ring disposed between the first and second clamping mechanisms;
   a guide mechanism extending circumferentially around the body and around at least a portion of the lock ring, wherein the guide is adapted to rotate about the axis of the body when the first and second clamping mechanisms couple the first and second work pieces together;
   a retainer mechanism coupled to a first side of the guide mechanism and adapted to retain a line; and
   an attachment point disposed on a second side of the guide opposite of the retainer mechanism and adapted to receive an accessory.

2. The clamp of claim 1, wherein the attachment point is one of a substantially round shape, a substantially rectangular shape, a substantially triangular shape, or a substantially trapezoidal shape.

3. The clamp of claim 1, wherein the first clamping mechanism is disposed at a first end of the body and adapted to receive the first work piece; and the second clamping mechanism is disposed at a second end of the body and adapted to receive the second work piece.

4. A clamp comprising:
   a body having opposing first and second ends and an axis;
   a first clamping mechanism disposed at the first end and adapted to receive a first work piece, wherein the first clamping mechanism includes:
      a first cap coupled to the first end: and
      a first split ring having opposing first and second chamfers and a first gap extending both through the first split ring and axially with respect to the first split ring, the first chamfer of the first split ring engaging the first cap and a size of the first gap is reduced as the first cap is coupled to the body;
   a second clamping mechanism disposed at the second end and adapted to receive a second work piece, wherein the second clamping mechanism includes:
      a second cap coupled to the second end; and
      a second split ring having opposing first and second chamfers and a second gap extending both through the second split ring and axially with respect to the second split ring, the first chamfer of the second split ring engaging the second cap and a size of the second gap is reduced as the second cap is coupled to the body;
   a guide disposed between the first and second clamping mechanisms, wherein the guide is adapted to rotate about the axis of the body when the first and second clamping mechanisms couple the first and second work pieces together; and
   an attachment point disposed on the guide and adapted to receive an accessory.

5. The clamp of claim 1, further comprising a retainer coupled to the guide and adapted to retain a line.

6. The clamp of claim 5, wherein the attachment point is disposed on a side of the guide opposite of the retainer.

7. The clamp of claim 5, wherein the retainer is a roller.

8. The clamp of claim 1, wherein the attachment point is one of a substantially round shape, a substantially rectangular shape, a substantially triangular shape, or a substantially trapezoidal shape.

9. The clamp of claim 1, wherein the first end includes a first threaded portion adapted to mate with the first cap to couple the first cap to the first end.

10. The clamp of claim 1, wherein the second end includes a second threaded portion adapted to mate with the second cap to couple the second cap to the second end.

11. The clamp of claim 1, wherein the body includes a body gap, and the first clamping mechanism includes a fastener adapted to close the body gap when inserted into the body.

12. The clamp of claim 1, wherein the first and second work pieces are nestable tubes.

\* \* \* \* \*